United States Patent
Yun

(10) Patent No.: US 10,099,671 B2
(45) Date of Patent: Oct. 16, 2018

(54) ELECTRIC BRAKE SYSTEM

(71) Applicant: MANDO CORPORATION, Gyeonggi-do (KR)

(72) Inventor: Sang-Won Yun, Seoul (KR)

(73) Assignee: MANDO CORPORATION, Gyeonggi-Do (KR)

( * ) Notice: Subject to any disclaimer, the term of this patent is extended or adjusted under 35 U.S.C. 154(b) by 0 days.

(21) Appl. No.: 15/298,167

(22) Filed: Oct. 19, 2016

(65) Prior Publication Data

US 2017/0106849 A1    Apr. 20, 2017

(30) Foreign Application Priority Data

Oct. 19, 2015    (KR) .................. 10-2015-0145159

(51) Int. Cl.
| | |
|---|---|
| *B60T 8/36* | (2006.01) |
| *B60T 13/74* | (2006.01) |
| *B60T 7/04* | (2006.01) |
| *B60T 8/40* | (2006.01) |
| *B60T 11/232* | (2006.01) |

(Continued)

(52) U.S. Cl.
CPC ............ *B60T 13/745* (2013.01); *B60T 7/042* (2013.01); *B60T 8/368* (2013.01); *B60T 8/4081* (2013.01); *B60T 11/232* (2013.01); *B60T 11/236* (2013.01); *B60T 13/146* (2013.01); *B60T 13/662* (2013.01); *B60T 13/686* (2013.01); *B60T 2270/82* (2013.01)

(58) Field of Classification Search
CPC .......... B60T 7/042; B60T 8/36; B60T 8/4081; B60T 13/745

USPC .......................................... 303/119.3; 60/545
See application file for complete search history.

(56) References Cited

U.S. PATENT DOCUMENTS

| | | | |
|---|---|---|---|
| 5,957,547 A * | 9/1999 | Schliebe ................. | B60T 8/368 303/119.3 |
| 7,742,304 B2 * | 6/2010 | Heise .................... | B60T 8/3675 165/80.3 |

(Continued)

FOREIGN PATENT DOCUMENTS

| | | |
|---|---|---|
| CN | 101186203 | 5/2008 |
| CN | 102625630 | 8/2012 |

(Continued)

OTHER PUBLICATIONS

Office Action dated Jul. 16, 2018 for Chinese Application No. 201610957982.2 and its English translation by Global Dossier.

*Primary Examiner* — Christopher P Schwartz
(74) *Attorney, Agent, or Firm* — Ladas & Parry, LLP

(57) ABSTRACT

An electric brake system is disclosed. The electric brake system comprises an electronic control unit configured to control a hydraulic pressure supply device and valves on the basis of hydraulic pressure information and pedal displacement information and including a circuit board on which a plurality of electronic elements are mounted, and the hydraulic pressure supply device configured to generate hydraulic pressure using a rotational force of a motor that is activated in response to an electrical signal output from the electronic control unit, wherein the circuit board and a housing of the hydraulic pressure supply device contact each other to transfer heat generated at the plurality of electronic elements to the housing of the hydraulic pressure supply device.

11 Claims, 5 Drawing Sheets

(51) Int. Cl.
*B60T 11/236* (2006.01)
*B60T 13/14* (2006.01)
*B60T 13/66* (2006.01)
*B60T 13/68* (2006.01)

(56) References Cited

U.S. PATENT DOCUMENTS

| | | | |
|---|---|---|---|
| 8,780,564 B2 * | 7/2014 | Yanai | B60T 13/686 |
| | | | 137/557 |
| 2006/0017321 A1 | 1/2006 | Tsunooka | |
| 2015/0075156 A1 * | 3/2015 | Nakano | B60T 13/745 |
| | | | 60/545 |

FOREIGN PATENT DOCUMENTS

| | | |
|---|---|---|
| EP | 2 520 473 | 11/2012 |
| JP | 4253885 | 4/2009 |
| JP | 2009-241702 | 10/2009 |
| WO | 2006/000470 | 1/2006 |

* cited by examiner

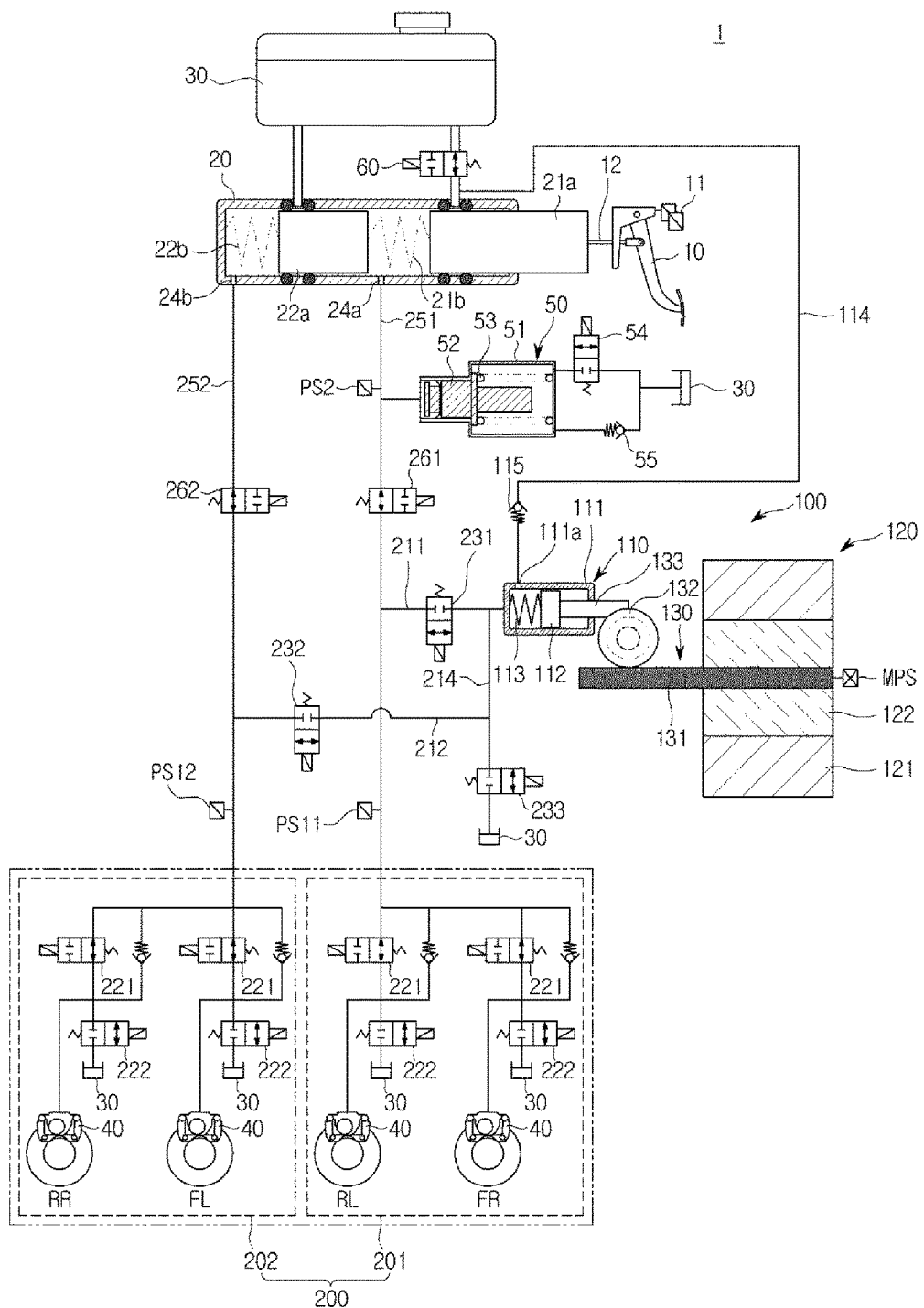
[Fig. 1]

[Fig. 2]
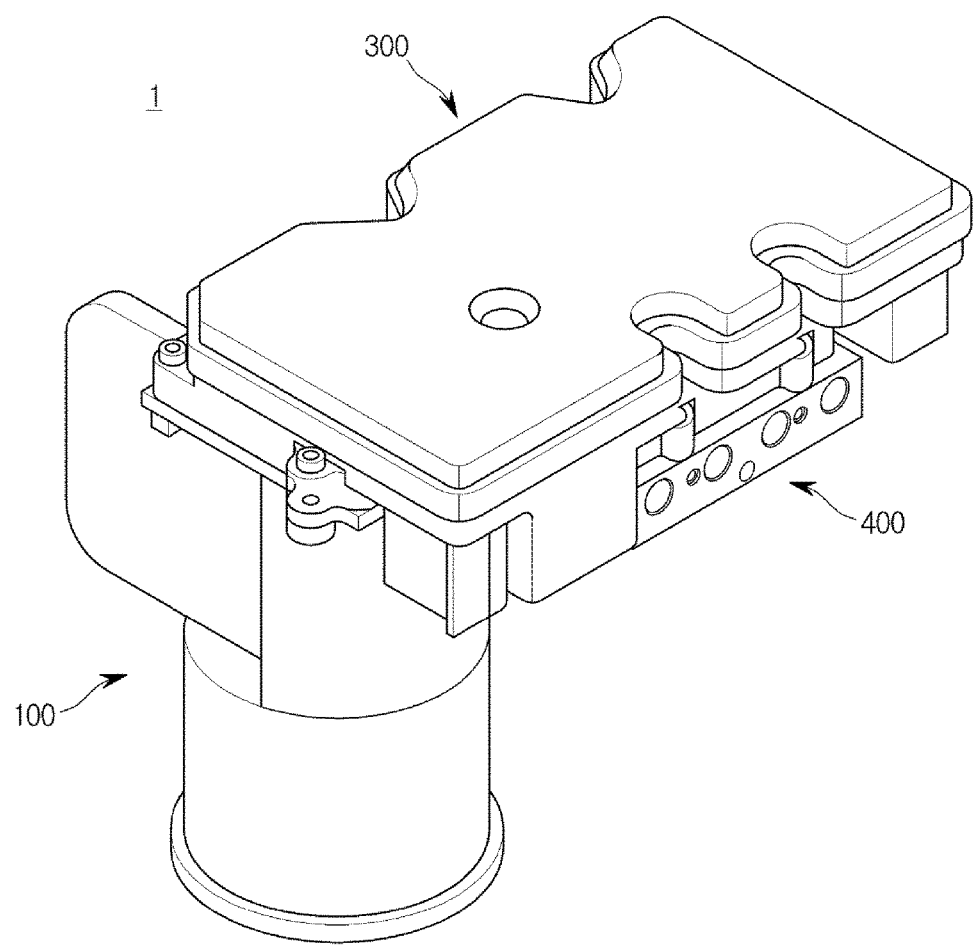

【Fig. 3】
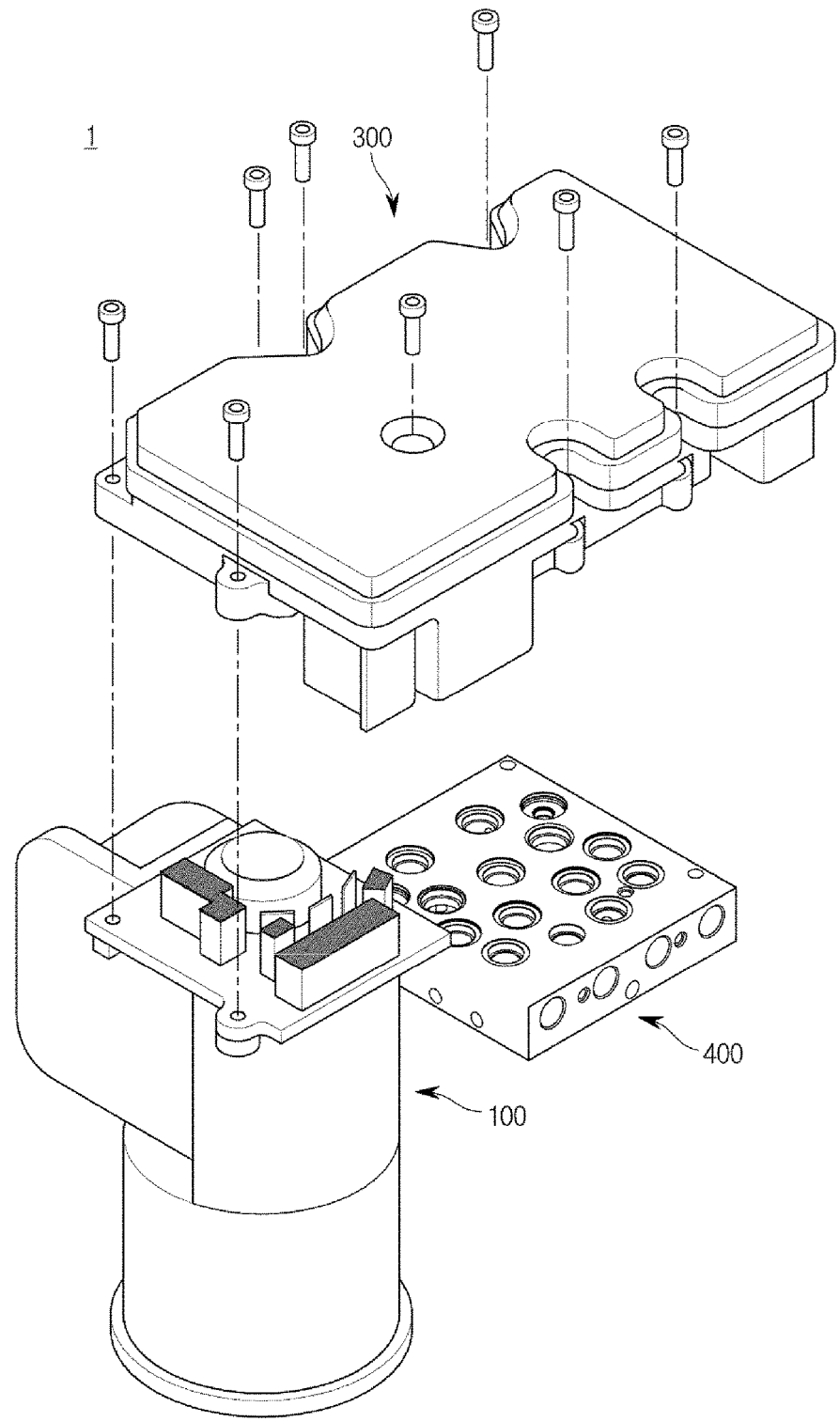

【Fig. 4】
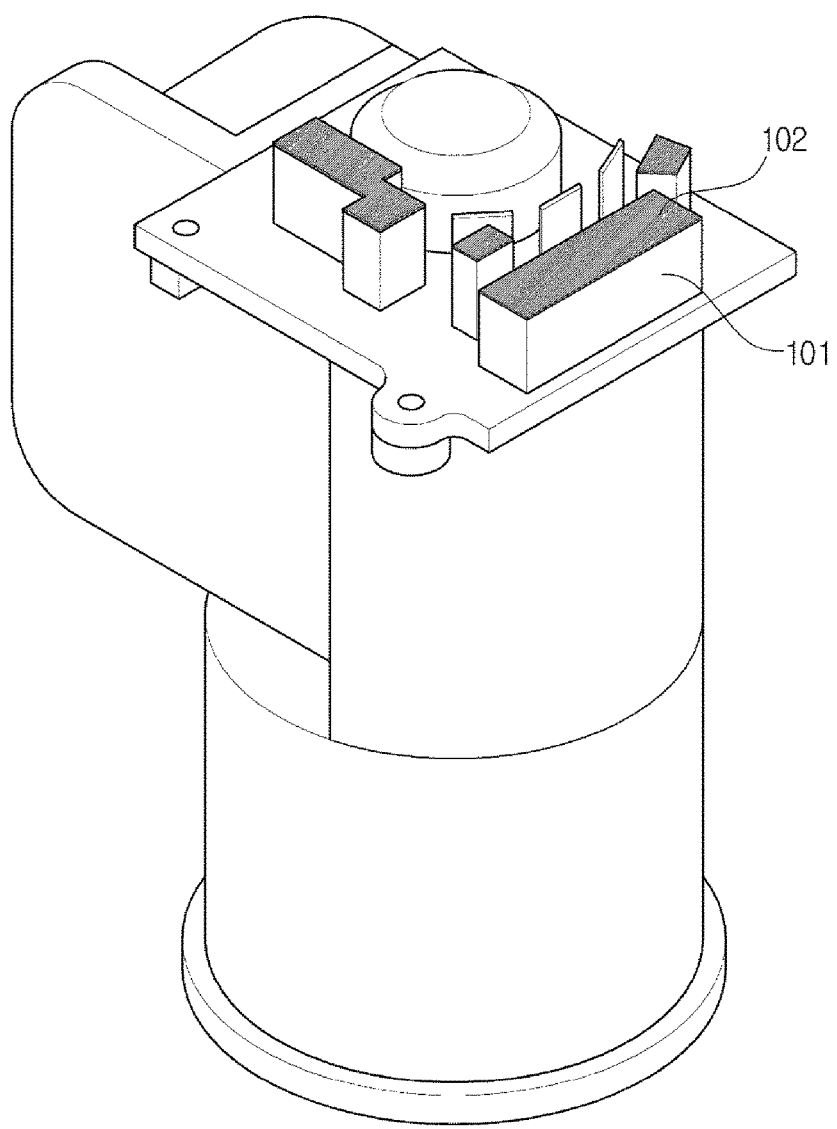

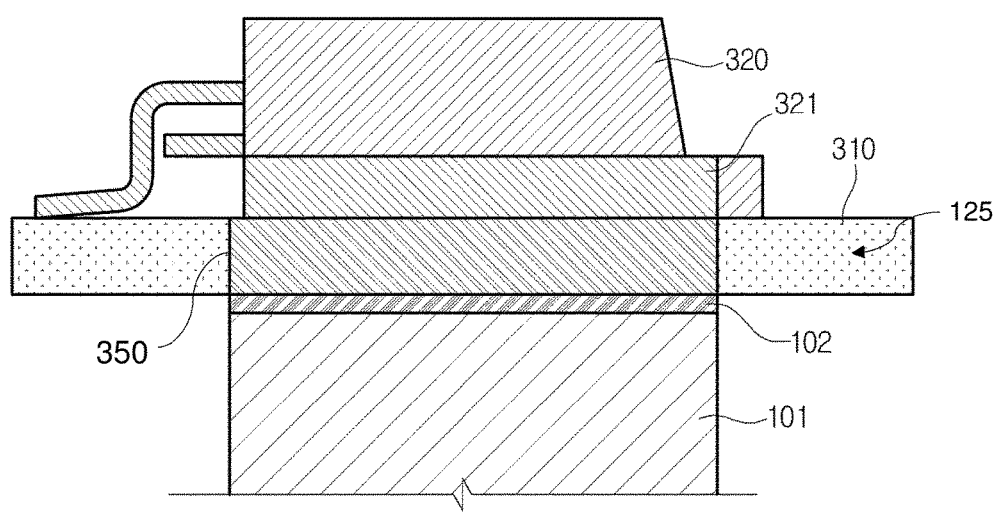
[Fig. 5]

ELECTRIC BRAKE SYSTEM

This application claims the benefit of Korean Patent Application No. 2015-0145159, filed on Oct. 19, 2015 in the Korean Intellectual Property Office, the disclosure of which is incorporated herein by reference.

BACKGROUND

1. Field

Embodiments of the present disclosure relate to an electric brake system, and more particularly, to an electric brake system generating a braking force using an electrical signal corresponding to a displacement of a brake pedal.

2. Description of the Related Art

A brake system for braking is necessarily mounted on a vehicle, and a variety of systems for providing stronger and more stable braking force have been proposed recently.

For example, there are brake systems including an anti-lock brake system (ABS) for preventing a wheel from sliding while braking, a brake traction control system (BTCS) for preventing a driving wheel from slipping when a vehicle is unintentionally or intentionally accelerated, an electronic stability control system (ESC) for stably maintaining a driving state of a vehicle by combining an ABS with a traction control to control hydraulic pressure of a brake, and the like.

Generally, an electric brake system includes a hydraulic pressure supply device which receives a braking intent of a driver in the form of an electrical signal from a pedal displacement sensor which senses a displacement of a brake pedal when the driver steps on the brake pedal and then supplies hydraulic pressure to a wheel cylinder.

An electric brake system provided with such a hydraulic pressure supply device is disclosed in European Registered Patent No. EP 2 520 473. According to the disclosure in that document, the hydraulic pressure supply device is configured such that a motor is activated according to a pedal effort of a brake pedal to generate braking pressure. At this point, the braking pressure is generated by converting a rotational force of the motor into a rectilinear movement to pressurize a piston.

An electric brake system includes an electronic control unit (ECU), and this ECU serves to electronically control a driving of each of components of a vehicle by receiving signals from various sensors, for example, an oxygen sensor, an air flow sensor, a water temperature sensor, a crank angle sensor, a motor position sensor, a barometric pressure sensor, and the like.

Such an ECU is required to satisfy durability against ambient heat according to a mounting position in a vehicle and also process an amount of data being gradually increased so that heating in the ECU may be considered as a problem, and to address heating in an electronic element should take precedence in order to realize miniaturization and high performance of the ECU.

In a conventional ECU, a heating problem is addressed such that a separate heat sink is attached to a rear surface of a circuit board to increase a heat transfer area when an element generating a large amount of heat is mounted on the circuit board.

However, a cooling of an electronic element, which relies on such a heat sink, is necessary not only to significantly increase a heat transfer area of the heat sink so as to have a large heat transfer amount but also to install a plurality of heat sinks at electronic elements, each of which generates a large amount of heat, so that there are problems in that a weight, a size, and a manufacturing cost of an ECU are increased.

[Prior Art Document]

(Patent Document) EP 2 520 473 A1 (Honda Motor Co., Ltd.), Nov. 7, 2012.

SUMMARY

Therefore, it is an aspect of the present disclosure to provide an electric brake system capable of effectively dissipating heat generated at an electronic elements installed at a circuit board and at the same time, decreasing a size of an electronic control unit.

Additional aspects of the disclosure will be set forth in part in the description which follows and, in part, will be obvious from the description, or may be learned by practice of the disclosure.

In accordance with one aspect of the present invention, there is provided an electric brake system, comprises an electronic control unit configured to control a hydraulic pressure supply device and valves on the basis of hydraulic pressure information and pedal displacement information and including a circuit board on which a plurality of electronic elements are mounted; and the hydraulic pressure supply device configured to generate hydraulic pressure using a rotational force of a motor that is activated in response to an electrical signal output from the electronic control unit, wherein the circuit board and a housing of the hydraulic pressure supply device contact each other to transfer heat generated at the plurality of electronic elements to the housing of the hydraulic pressure supply device.

Also, a via hole is formed in a region of the circuit board at which the plurality of electronic elements are mounted, a conductive material is filled in the via hole, and the plurality of electronic elements, the conductive material, the housing of the hydraulic pressure supply device are sequentially connected.

Also, a heat dissipation protrusion is formed to protrude from one surface of the housing of the hydraulic pressure supply device to come into contact with the circuit substrate.

Also, the heat dissipation protrusion is provided as a metal material.

Also, a via hole is formed in a region of the circuit board at which the plurality of electronic elements are mounted, a conductive material is filled in the via hole, and an insulating material is interposed between the conductive material and the heat dissipation protrusion.

Also, electric brake system the insulating material includes silicone.

Also, the electric brake system further comprises a modulator block configured to accommodate the valves and form a flow path, wherein the modulator block is coupled to the electronic control unit.

BRIEF DESCRIPTION OF THE DRAWINGS

FIG. 1 is a hydraulic circuit diagram illustrating a non-braking state of an electric brake system according to one embodiment of the present disclosure.

FIG. 2 is a perspective view of a part of the electric brake system according to one embodiment of the present disclosure.

FIG. 3 is an exploded perspective view of FIG. 2.

FIG. 4 is a perspective view of the hydraulic pressure supply device according to one embodiment of the present disclosure.

FIG. 5 is a cross-sectional view of a heat dissipation structure of a coupling portion between the ECU and the hydraulic pressure supply device.

DETAILED DESCRIPTION

Hereinafter, embodiments of the present disclosure will be described in detail with reference to the accompanying drawings. The embodiments to be described below are provided to fully convey the spirit of the present disclosure to a person skilled in the art. The present disclosure is not limited to the embodiments disclosed herein and may be implemented in other forms. In the drawings, some portions not related to the description will be omitted and will not be shown in order to clearly describe the present disclosure, and also a size of a component may be somewhat exaggerated to help understanding.

FIG. 1 is a hydraulic circuit diagram illustrating a non-braking state of an electric brake system 1 according to one embodiment of the present disclosure.

Referring to FIG. 1, the electric brake system 1 generally includes a master cylinder 20 for generating hydraulic pressure, a reservoir 30 coupled to an upper part of the master cylinder 20 to store oil, an input rod 12 for pressurizing the master cylinder 20 according to a pedal effort of a brake pedal 10, a wheel cylinder 40 for receiving the hydraulic pressure to perform braking of each of wheels RR, RL, FR, and FL, a pedal displacement sensor 11 for sensing a displacement of the brake pedal 10, and a simulation device 50 for providing a reaction force according to the pedal effort of the brake pedal 10.

The master cylinder 20 may be configured to include at least one chamber to generate hydraulic pressure. As one example, the master cylinder 20 may be configured to include two chambers, a first piston 21a and a second piston 22a may be provided at the two chambers, respectively, and the first piston 21a may be connected to the input rod 12.

Meanwhile, the master cylinder 20 may include two chambers to secure safety when one chamber fails. For example, one of the two chambers may be connected to a front right wheel FR and a rear left wheel RL of a vehicle, and the remaining chamber may be connected to a front left wheel FL and a rear right wheel RR. Otherwise, one of the two chambers may be connected to two front wheels FR and FL and the remaining chamber may be connected to two rear wheels RR and RL. As described above, the two chambers may be independently configured so that braking of a vehicle may be possible even when one of the two chambers fails.

For this purpose, the master cylinder 20 may include first and second hydraulic ports 24a and 24b which are formed thereon and through which hydraulic pressure is discharged from each of the two chambers.

Further, a first spring 21b may be provided between the first piston 21a and the second piston 22a of the master cylinder 20, and a second spring 22b may be provided between the second piston 22a and a rear end of the master cylinder 20.

The first spring 21b and the second spring 22b are provided at the two chambers, respectively, and an elastic force is stored in the first spring 21b and the second spring 22b when the first piston 21a and the second piston 22a are compressed according to a variance of displacement of the brake pedal 10. Further, when a force pushing the first piston 21a is less than the elastic force, the first spring 21b and the second spring 22b may use the stored elastic force to push the first and second pistons 21a and 22a and return the first and second pistons 21a and 22a to their original positions, respectively.

Meanwhile, the input rod 12 pressurizing the first piston 21a of the master cylinder 20 may come into close contact with the first piston 21a. In other words, no gap may exist between the master cylinder 20 and the input rod 12. Consequently, when the brake pedal 10 is stepped on, the master cylinder 20 may be directly pressurized without a pedal dead stroke section.

The simulation device 50 may be connected to a first backup flow path 251 which will be described below to provide a reaction force according to a pedal effort of the brake pedal 10. A reaction force may be provided to compensate for a pedal effort provided from a driver such that a braking force may be finely controlled as intended by the driver.

The simulation device 50 includes a simulation chamber 51 provided to store oil discharged from the first hydraulic port 24a of the master cylinder 20, a reaction force piston 52 provided inside the simulation chamber 51, a pedal simulator provided with a reaction force spring 53 elastically supporting the reaction force piston 52, and a simulator valve 54 connected to a rear end part of the simulation chamber 51.

The reaction force piston 52 and the reaction force spring 53 are respectively installed to have a predetermined range of displacement within the simulation chamber 51 by means of oil flowing therein.

Meanwhile, the reaction force spring 53 shown in the drawing is merely one embodiment capable of providing an elastic force to the reaction force piston 52, and thus it may include numerous embodiments capable of storing an elastic force through shape deformation. As one example, the reaction force spring 53 includes a variety of members which are configured with a material including rubber and the like and have a coil or plate shape, thereby being able to store an elastic force.

The simulator valve 54 may be provided at a flow path connecting a rear end of the simulation chamber 51 to the reservoir 30. A front end of the simulation chamber 51 may be connected to the master cylinder 20, and the rear end of the simulation chamber 51 may be connected to the reservoir 30 through the simulator valve 54. Therefore, when the reaction force piston 52 returns, oil inside the reservoir 30 may flow through the simulator valve 54 so that an inside of the simulation chamber 51 is entirely filled with the oil.

Meanwhile, a plurality of reservoirs 30 are shown in the drawing, and the same reference number is assigned to each of the plurality of reservoirs 30. The reservoirs may be configured with the same components and may alternatively be configured with different components. As one example, the reservoir 30 connected to the simulation device 50 may be the same as the reservoir 30 connected to the master cylinder 20 or may be a storage part capable of storing oil separately from the reservoir 30 connected to the master cylinder 20.

Meanwhile, the simulator valve 54 may be configured with a normally closed type solenoid valve usually maintaining a closed state. When the driver applies a pedal effort to the brake pedal 10, the simulator valve 54 may be opened to deliver brake oil between the simulation chamber 51 and the reservoir 30.

Also, a simulator check valve 55 may be installed to be connected in parallel with the simulator valve 54 between the pedal simulator and the reservoir 30. The simulator check valve 55 may allow the oil inside the reservoir 30 to flow toward the simulation chamber 51 and may block the oil inside the simulation chamber 51 from flowing toward the reservoir 30 through a flow path at which the simulator check valve 55 is installed. When the pedal effort of the brake pedal 10 is released, the oil may be provided inside the simulation chamber 51 through the simulator check valve 55 to ensure a rapid return of pressure of the pedal simulator.

To describe an operating process of the simulation device 50, when the driver applies a pedal effort to the brake pedal 10, the oil inside the simulation chamber 51, which is pushed by the reaction force piston 52 of the pedal simulator while the reaction force piston 52 compresses the reaction force spring 53, is delivered to the reservoir 30 through the simulator valve 54, and then a pedal feeling is provided to the driver through such an operation. Further, when the driver releases the pedal effort from the brake pedal 10, the reaction force spring 53 may push the reaction force piston 52 to return the reaction force piston 52 to its original state, and the oil inside the reservoir 30 may flow into the simulation chamber 51 through the flow path at which the simulator valve 54 is installed and the flow path at which the simulator check valve 55 is installed, thereby completely filling the inside of the simulation chamber 51 with the oil.

As described above, because the inside of the simulation chamber 51 is in a state in which the oil is filled therein at all times, friction of the reaction force piston 52 is minimized when the simulation device 50 is operated, and thus durability of the simulation device 50 may be improved and also introduction of foreign materials from the outside may be blocked.

The electric brake system 1 according to the embodiment of the present disclosure may include a hydraulic pressure supply device 100 which is mechanically operated by receiving a braking intent of the driver in the form of an electrical signal from the pedal displacement sensor 11 measuring a displacement of the brake pedal 10, a hydraulic control unit 200 configured with first and second hydraulic circuits 201 and 202, each of which is provided at two wheels respectively, and controlling a hydraulic pressure flow delivered to the wheel cylinder 40 that is provided at each of the wheels RR, RL, FR, and FL, a first cut valve 261 provided at the first backup flow path 251 connecting the first hydraulic port 24*a* to the first hydraulic circuit 201 to control a hydraulic pressure flow, a second cut valve 262 provided at a second backup flow path 252 connecting the second hydraulic port 24*b* to the second hydraulic circuit 202 to control a hydraulic pressure flow, and an electronic control unit (ECU) 300 (see, FIG. 2) controlling the hydraulic pressure supply device 100 and valves 54, 221, 222, 223, 224, 231, 232, 241, 242, 261, and 262 on the basis of hydraulic pressure information and pedal displacement information.

The hydraulic pressure supply device 100 includes a hydraulic pressure supply unit 110 providing oil pressure delivered to the wheel cylinder 40, a motor 120 generating a rotational force in response to an electrical signal of the pedal displacement sensor 11, and a power conversion unit 130 converting a rotational movement of the motor 120 into a rectilinear movement and transmitting the rectilinear movement to the hydraulic pressure supply unit 110.

The hydraulic pressure supply unit 110 may include a pressure chamber 111 in which a predetermined space is formed to receive and store oil therein, a hydraulic piston 112 provided inside the pressure chamber 111, and a hydraulic spring 113 provided between the hydraulic piston 112 and the pressure chamber 111 to elastically support the hydraulic piston 112.

The pressure chamber 111 may be connected to the reservoir 30 by means of an oil flow path 114 and may receive oil from the reservoir 30 and store the oil therein. The oil flow path 114 may communicate with a first communicating hole 111*a* that is formed at an inlet side of the pressure chamber 111. As one example, the first communicating hole 111*a* may be formed at the inlet side of the pressure chamber 111 in which pressure is generated while the hydraulic piston 112 is moved forward.

Also, a check valve 115 may be installed at the oil flow path 114 to prevent pressure of the pressure chamber 111 from backflowing. The check valve 115 is provided to block the oil inside the pressure chamber 111 from leaking to the reservoir 30 through the oil flow path 114 while the hydraulic piston 112 is moved forward, and it is provided to allow the oil inside the reservoir 30 to be suctioned and stored in the inlet side of the pressure chamber 111 while the hydraulic piston 112 is returned to its original position.

The motor 120 is a device for generating a rotational force according to a signal output from the ECU 300 and may generate a rotational force in a forward or backward direction. An angular velocity and a rotational angle of the motor 120 may be precisely controlled. Because such a motor 120 is generally known in the art, a detailed description thereof will be omitted.

Meanwhile, the ECU 300 controls not only the motor 120 but also valves provided in the electric brake system 1 of the present disclosure, which will be described below. An operation of controlling a plurality of valves according to a displacement of the brake pedal 10 will be described below.

A driving force of the motor 120 generates a displacement of the hydraulic piston 112 through the power conversion unit 130, and the hydraulic pressure is delivered to the wheel cylinder 40 installed at each of the wheels RR, RL, FR, and FL through first and second hydraulic flow paths 211 and 212, wherein the hydraulic pressure is generated while the hydraulic piston 112 slides inside the pressure chamber 111.

The power conversion unit 130 is a device for converting a rotational force into a rectilinear movement and may be configured with a worm shaft 131, a worm wheel 132, and a drive shaft 133.

The worm shaft 131 may be integrally formed with a rotational shaft of the motor 120 and rotates the worm wheel 132 engaged therewith and coupled thereto through a worm that is formed on an outer circumferential surface of the worm shaft 131.

The worm wheel 132 linearly moves the drive shaft 133 engaged therewith and coupled thereto, and the drive shaft 133 is connected to the hydraulic piston 112 to slide the hydraulic piston 112 inside the pressure chamber 111.

To describe such operations again, a signal, which is sensed by the pedal displacement sensor 11 when a displacement occurs at the brake pedal 10, is transmitted to the ECU 300 and then the ECU 300 activates the motor 120 in one direction to rotate the worm shaft 131 in the one direction. A rotational force of the worm shaft 131 is transmitted to the drive shaft 133 via the worm wheel 132, and then the hydraulic piston 112 connected to the drive shaft 133 is moved to generate hydraulic pressure in the pressure chamber 111.

On the other hand, when the pedal effort is released from the brake pedal 10, the ECU 300 drives the motor 120 in a reverse direction to reversely rotate the worm shaft 131. Consequently, the worm wheel 132 is also reversely rotated, and then the hydraulic piston 112 connected to the drive shaft 133 is returned to its original position. At this point, the hydraulic spring 113 may provide an elastic force to the hydraulic piston 112 so that the hydraulic pressure inside the pressure chamber 111 may be rapidly delivered.

As described above, the hydraulic pressure supply device 100 serves to deliver the hydraulic pressure to the wheel cylinders 40 or to discharge and deliver the hydraulic pressure to the reservoir 30 according to a rotational direction of the rotational force generated from the motor 120.

Further, although not shown in the drawing, the power conversion unit 130 may be configured with a ball screw nut assembly. For example, the power conversion unit 130 may be configured with a screw which is integrally formed with the rotational shaft of the motor 120 or is connected to and rotated with the rotational shaft thereof, and a ball nut which is screw-coupled to the screw in a state in which a rotation of the ball nut is restricted to perform a rectilinear movement according to a rotation of the screw. The hydraulic piston 112 is connected to the ball nut of the power conversion unit 130 to pressurize the pressure chamber 111 by means of the rectilinear movement of the ball nut, and the hydraulic spring 113 serves to return the hydraulic piston 112 to its original position while the ball nut is returned to its original position. Such a ball screw nut assembly is a device for converting a rotational movement into a rectilinear movement, and a structure thereof is generally known in the art so that a detailed description thereof will be omitted.

Also, it should be understood that the power conversion unit 130 according to the embodiment of the present disclosure may employ any structure capable of converting a rotational movement into a rectilinear movement in addition to the structure of the ball screw nut assembly.

Next, the hydraulic control unit 200 according to one embodiment of the present disclosure will be described with reference to FIG. 1.

The hydraulic control unit 200 may be configured with the first hydraulic circuit 201 and the second hydraulic circuit 202, each of which receives hydraulic pressure to control two wheels. As one example, the first hydraulic circuit 201 may control the front right wheel FR and the rear left wheel RL, and the second hydraulic circuit 202 may control the front left wheel FL and the rear right wheel RR. Further, the wheel cylinder 40 installed at each of the wheels FR, FL, RR, and RL performs braking by receiving the hydraulic pressure.

Also, the hydraulic control unit 200 may receive hydraulic pressure from the hydraulic pressure supply device 100 through the first hydraulic flow path 211 connecting the first hydraulic circuit 201 and the hydraulic pressure supply device 100, and the second hydraulic flow path 212 connected to the second hydraulic circuit 202. At this point, the second hydraulic flow path 212 may be connected to a branching flow path 214 that branches from the first hydraulic flow path 211.

Further, the first and second hydraulic flow paths 211 and 212 are connected to each other through the branching flow path 214 and receive the hydraulic pressure from the hydraulic pressure supply device 100 to deliver the received hydraulic pressure to the wheel cylinder 40 of each of the hydraulic circuits 201 and 202. At this point, each of the hydraulic circuits 201 and 202 may be provided with a plurality of inlet valves 221 to control a hydraulic pressure flow.

As one example, two inlet valves 221 may be provided in the first hydraulic circuit 201 to be connected to the first hydraulic flow path 211, thereby independently controlling the hydraulic pressure delivered to two wheel cylinders 40. Also, two inlet valves 221 are provided in the second hydraulic circuit 202 to be connected to the second hydraulic flow path 212, thereby independently controlling the hydraulic pressure delivered to two wheel cylinders 40.

The plurality of inlet valves 221 may be disposed at an upstream side of each of the wheel cylinders 40 and may be configured with a normally opened type solenoid valve that is usually opened and is closed when a closing signal is received from the ECU 300.

Also, the hydraulic control unit 200 may be further provided with a plurality of outlet valves 222 connected to the reservoirs 30 to improve brake release performance when the brake is released. Each of the outlet valves 222 is connected to the wheel cylinder 40 to control discharging of the hydraulic pressure from each of the wheels RR, RL, FR, and FL. That is, when brake pressure of each of the wheels RR, RL, FR, and FL is measured and a decompression of the brake is determined to be required, the outlet valves 222 may be selectively opened to control the brake pressure.

Further, the outlet valves 222 may be configured with a normally closed type solenoid valve that is usually closed and is opened when an opening signal is received from the ECU 300.

In addition, the electric brake system 1 according to the embodiment of the present disclosure may further include a first switching valve 231 provided at the first hydraulic flow path 211 and a second switching valve 232 provided at the second hydraulic flow path 212.

The first and second switching valves 231 and 232 are independently controlled and may be configured with a normally closed type solenoid valve that is usually closed and is opened when an opening signal is received. The first and second switching valves 231 and 232 serve to control a hydraulic pressure flow being delivered to the wheel cylinders 40 by being selectively opened and closed according to a required pressure. For example, when hydraulic pressure should be delivered only to the wheel cylinders 40 provided at the first hydraulic circuit 201, the first switching valve 231 is opened to deliver the hydraulic pressure discharged through the hydraulic pressure supply device 100 only to the first hydraulic circuit 201 instead of the second hydraulic circuit 202. Operational structures of the first and second switching valves 231 and 232 will be described again below.

Also, the electric brake system 1 according to the embodiment of the present invention may further include a release valve 233 that controls a pressure to converge on a set target pressure value when the pressure according to a pedal effort of the brake pedal 10 is generated to be higher than the set target pressure value.

The release valve 233 may be provided at a flow path connecting the reservoir 30 to the branching flow path 214 that connects the two hydraulic circuits 201 and 202. That is, the release valve 233 may be provided between the first and second switching valves 231 and 232 and the hydraulic pressure supply device 100. The release valve 233 may be configured with a normally closed type solenoid valve that is usually closed and is opened when an opening signal is received.

The electric brake system 1 according to the embodiment of the present disclosure may further include the first and second backup flow paths 251 and 252 capable of directly supplying the oil discharged from the master cylinder 20 to the wheel cylinders 40 when the electric brake system 1 abnormally operates.

The first cut valve 261 for controlling an oil flow may be provided at the first backup flow path 251, and the second cut valve 262 for controlling an oil flow may be provided at the second backup flow path 252. Also, the first backup flow path 251 may connect the first hydraulic port 24*a* to the first hydraulic circuit 201, and the second backup flow path 252 may connect the second hydraulic port 24b to the second hydraulic circuit 202.

Further, the first and second cut valves 261 and 262 may be configured with a normally open type solenoid valve that is usually open and is closed when a closing signal is received from the ECU 300. Operational structures of the first and second cut valves 261 and 262 will be described again below.

Meanwhile, an undescribed reference number "PS11" is a first hydraulic flow path pressure sensor which senses hydraulic pressure of the first hydraulic circuit 201, an undescribed reference number "PS12" is a second hydraulic flow path pressure sensor which senses hydraulic pressure of the second hydraulic circuit 202, and an undescribed reference number "PS2" is a backup flow path pressure sensor which senses oil pressure of the master cylinder 20. Further, an undescribed reference number "MPS" is a motor control sensor which controls a rotational angle or a current of the motor 120.

FIG. 2 is a perspective view of a part of the electric brake system 1 according to one embodiment of the present disclosure, and FIG. 3 is an exploded perspective view of FIG. 2.

The electric brake system 1 according to one embodiment of the present disclosure may be formed as a single assembly or module by coupling the ECU 300, the hydraulic pressure supply device 100, and a modulator block 400 with each other. Also, although not shown in the drawing, the master cylinder 20, the reservoir 30, the simulation device 50 may be further coupled with each other to form the assembly or module.

The ECU 300 includes a housing body having an opened one side, a circuit board 310 (see, FIG. 5) accommodated and fixed inside the housing body, a connector connecting the circuit board 310 to the outside, and a cover covering an opening of a housing.

The ECU 300 is configured such that the circuit board 310 configuring an electronic circuit is accommodated in the housing body and the cover is coupled to the opened one side of the housing body. At this point, the housing body and the cover are made of a conventional plastic material.

FIGS. 2 and 3 illustrate a state in which the housing and the cover are coupled to each other so that the circuit board 310 accommodated therein is not shown, but a configuration of the circuit board 310 and the connector may employ a form that is generally implemented in the related art. Consequently, although such a configuration is not shown, there is no difficulty in understanding the ECU 300 according to the embodiment of the present disclosure.

The modulator block 400 may configure the hydraulic control unit 200 shown in FIG. 1. Generally, the modulator block 400 is provided as a rectangular parallelepiped metal mass, and includes a plurality of accommodation bores at which a plurality valves, pressure sensors and the like are installed and flow paths connecting the plurality of accommodation bores to each other, thereby configuring the hydraulic control unit 200. A description of a detailed configuration of the modulator block 400 will be omitted.

Next, a heat dissipation structure of the electric brake system 1 according to the embodiment of the present disclosure will be described with reference to FIGS. 4 and 5.

FIG. 4 is a perspective view of the hydraulic pressure supply device 100 according to one embodiment of the present disclosure, and FIG. 5 is a cross-sectional view of a heat dissipation structure of a coupling portion between the ECU 300 and the hydraulic pressure supply device 100.

An electronic element 320 is mounted on the circuit board 310. In order to miniaturize the ECU 300, an element, for example, a field effect transistor (FET), driving a large amount of current is used as the electronic element 320 mounted on the circuit board 310 to control operations of a motor and a valve and an electrical boosting function, and a heat dissipation structure in which a separate heat sink 321 is installed is formed because the FET generates a large amount of heat.

The ECU 300 is formed by the circuit board 310 in which a plurality of electronic elements 320 are installed to configure an electronic circuit, and the circuit board 310 is electrically connected to the modulator block 400.

The housing body and the cover should protect the circuit board 310 from external environment and also sufficiently radiate heat generated at the electronic element 320 installed at the circuit board 310 inside the housing body and the cover, and thus further deformation against heat should not occur at the housing body and the cover while maintaining an internal temperature at a proper temperature or less. Metal is suitable for such requirements, but a material including a kind of plastic is mainly used for the purpose of weight reduction of the ECU 300.

In the electric brake system 1 according to one embodiment of the present disclosure, the ECU 300 and the hydraulic pressure supply device 100 are connected to each other to radiate heat of the ECU 300.

Referring to FIG. 1, the hydraulic pressure supply device 100 includes the motor 120, the power conversion unit 130, and the hydraulic pressure supply unit 110, and these are accommodated inside the housing. In FIG. 4, only an external appearance of the housing of the hydraulic pressure supply device 100 is shown, but it will be easily assumed that the motor 120, the power conversion unit 130, and the hydraulic pressure supply unit 110 may be accommodated inside the housing that is shown.

A heat dissipation protrusion 101 may be formed to protrude at one surface of the housing of the hydraulic pressure supply device 100. The heat dissipation protrusion 101 is provided to come into contact with the circuit board 310 of the ECU 300. Generally, the housing of the hydraulic pressure supply device 100 is provided as a robust metal material to protect devices accommodated thereinside. Further, the heat dissipation protrusion 101 is provided as a metal material. Therefore, heat generated at the circuit board 310 may be transferred to the housing of the hydraulic pressure supply device 100 through the heat dissipation protrusion 101.

Referring to FIG. 5, a through hole 350 may be formed at a position of the circuit board 310 at which the electronic element 320 is disposed. The through hole 350 may be filled with metal, for example, lead (Pb). Also, the heat sink 321 may be disposed between the through hole 350 and the electronic element 320, and the heat sink 321 is also provided as a metal material.

In addition, a thermal conductor 102 having a superior thermal conductivity is interposed between the circuit board 310 and the heat dissipation protrusion 101. A thermal adhesive having an insulation property may be used as the thermal conductor 102, and, for example, silicone may be used. When the circuit board 310 and the heat dissipation protrusion 101 directly contact each other in a state in which the heat dissipation protrusion 101 made of a metal material is grounded, there is a risk that a circuit may be shorted. To prevent such a short circuit, a thermal conductor being interposed or applied between the heat dissipation protrusion 101 and the circuit board 310 may be provided as an insulating material.

As should be apparent from the above description, the electric brake system according to the embodiments of the present disclosure is capable of transferring and radiating heat generated from an electronic element, which is a heating element, to and from a housing of a hydraulic pressure supply device made of metal so that there is an effect of superior heat dissipation.

Also, a thermal conductor being disposed between a housing of a hydraulic pressure supply device and a circuit board is provided as an insulating material so that there is an effect in which a short circuit is prevented.

Further, a circuit board and a housing of a hydraulic pressure supply device are directly contacted and coupled to each other so that thermal resistance may be reduced.

Moreover, there is an effect in which a dimension (a size) of an ECU may be decreased and a manufacturing cost may be reduced. That is, a manufacturing cost may be reduced compared to a conventional housing and a conventional cover which are made of aluminum.

[Description of Reference Numerals]

| | |
|---|---|
| 10: Brake Pedal | 11: Pedal Displacement Sensor |
| 20: Master Cylinder | 30: Reservoir |
| 40: Wheel Cylinder | 50: Simulation Device |
| 54: Simulator Valve | 60: Inspection Valve |
| 100: Hydraulic Pressure Supply Device | 101: Heat Dissipation Protrusion |
| 102: Thermal Conductor | 110: Hydraulic Pressure Supply Unit |
| 120: Motor | 130: Power Conversion Unit |
| 200: Hydraulic Control Unit | 201: First Hydraulic Circuit |
| 202: Second Hydraulic Circuit | 211: First Hydraulic Flow Path |
| 212: Second Hydraulic Flow Path | 221: Inlet Valve |
| 222: Outlet Valve | 231: First Dump Valve |
| 232: Second Dump Valve | 241: First Balance Valve |
| 242: Second Balance Valve | 250: Circuit Balance Valve |
| 251: First Backup Flow Path | 252: Second Backup Flow Path |
| 261: First Cut Valve | 262: Second Cut Valve |
| 300: Electronic Control Unit | 310: Circuit Substrate |
| 320: Electronic Element | 321: Heat Sink |
| 400: Modulator Block | |

What is claimed is:

1. An electric brake system comprising:
   an electronic control unit configured to control a hydraulic pressure supply device and valves on the basis of hydraulic pressure information and pedal displacement information and including a circuit board on which a plurality of electronic elements are mounted; and
   the hydraulic pressure supply device configured to generate hydraulic pressure using a rotational force of a motor that is activated in response to an electrical signal output from the electronic control unit,
   wherein the circuit board of the electronic control unit and a housing of the hydraulic pressure supply device directly contact each other to transfer heat generated at the plurality of electronic elements to the housing of the hydraulic pressure supply device.

2. The electric brake system of claim 1, wherein the hydraulic pressure supply device comprises a heat dissipation protrusion formed to protrude from one surface of the housing of the hydraulic pressure supply device to come into contact with the circuit substrate.

3. The electric brake system of claim 2, wherein the heat dissipation protrusion is provided as a metal material.

4. The electric brake system of claim 3, wherein the circuit board comprises:
   at least one hole formed in a region of the circuit board at which the plurality of electronic elements are mounted;
   a conductive material filled in the hole; and
   an insulating material interposed between the conductive material and the heat dissipation protrusion.

5. The electric brake system of claim 4, wherein the insulating material includes silicone.

6. The electric brake system of claim 1, wherein the circuit board comprises: at least one hole formed in the region at which the electronic elements are disposed; a conductive material filled in the hole; and a heat sink disposed between the hole and at least one of the electronic elements.

7. The electric brake system of claim 6, further comprising an insulating material positioned between the conductive material and the heat dissipation protrusion.

8. The electric brake system of claim 1, wherein the circuit board comprises:
   a hole formed in a region of the circuit board at which the plurality of electronic elements are mounted; and
   a conductive material filled in the hole, wherein the conductive material is disposed between the plurality of electronic elements and the housing of the hydraulic pressure supply device.

9. The electric brake system of claim 1, further comprising:
   a modulator block configured to accommodate the valves and form a flow path,
   wherein the modulator block is coupled to the electronic control unit.

10. The electric brake system of claim 1, wherein the hydraulic pressure supply device comprises: a heat dissipation protrusion protruding from one surface of the housing of the hydraulic pressure supply; and a thermal conductor positioned between the circuit board and the heat dissipation protrusion.

11. The electric brake system of claim 1, wherein a surface of the circuit board of the electronic control unit is directly contacted with a surface of the housing of the hydraulic pressure supply device.

* * * * *